United States Patent [19]

Balzan et al.

[11] 4,403,258

[45] Sep. 6, 1983

[54] METHOD AND DEVICE FOR SEQUENTIALLY IMAGING AN ORIGINAL

[75] Inventors: Angelo Balzan, Mühlethal; Hans Stroppel, Therwil, both of Switzerland

[73] Assignee: Ringier & Co., AG., Zofingen, Switzerland

[21] Appl. No.: 315,580

[22] Filed: Oct. 27, 1981

[30] Foreign Application Priority Data

Nov. 7, 1980 [CH] Switzerland .................. 8290/80

[51] Int. Cl.³ .................. H04N 1/24; H04N 1/40
[52] U.S. Cl. .................. 358/284; 358/294
[58] Field of Search .................. 358/284, 294, 80

[56] References Cited

U.S. PATENT DOCUMENTS

| | | | |
|---|---|---|---|
| 2,691,696 | 10/1954 | Yule | 358/294 |
| 2,962,548 | 11/1960 | Taudt | 358/284 |
| 3,194,882 | 7/1965 | Hall | 358/80 |
| 3,450,830 | 6/1969 | Kyte | 358/80 |
| 4,051,536 | 9/1977 | Roetling | 358/298 |
| 4,128,850 | 12/1978 | Fischer | 358/294 |

*Primary Examiner*—Howard Britton
*Attorney, Agent, or Firm*—Ladas & Parry

[57] ABSTRACT

A scanning device movable with respect to an original is provided for scanning the latter. An optical system focuses the light emitted by a region of the original on a plurality of photo-sensors, the output signals of which are then amplified, selectively inverted, and added. The summed up signal thus obtained is input into a processor which generates a driving signal for controlling a stylus which moves in synchronism with the original relatively to a printing cylinder, and engraves on it an image of said region. The response of the photosensors to light which issues from different parts of the region can be regulated by means of optical filters having locally varying densities.

11 Claims, 2 Drawing Figures

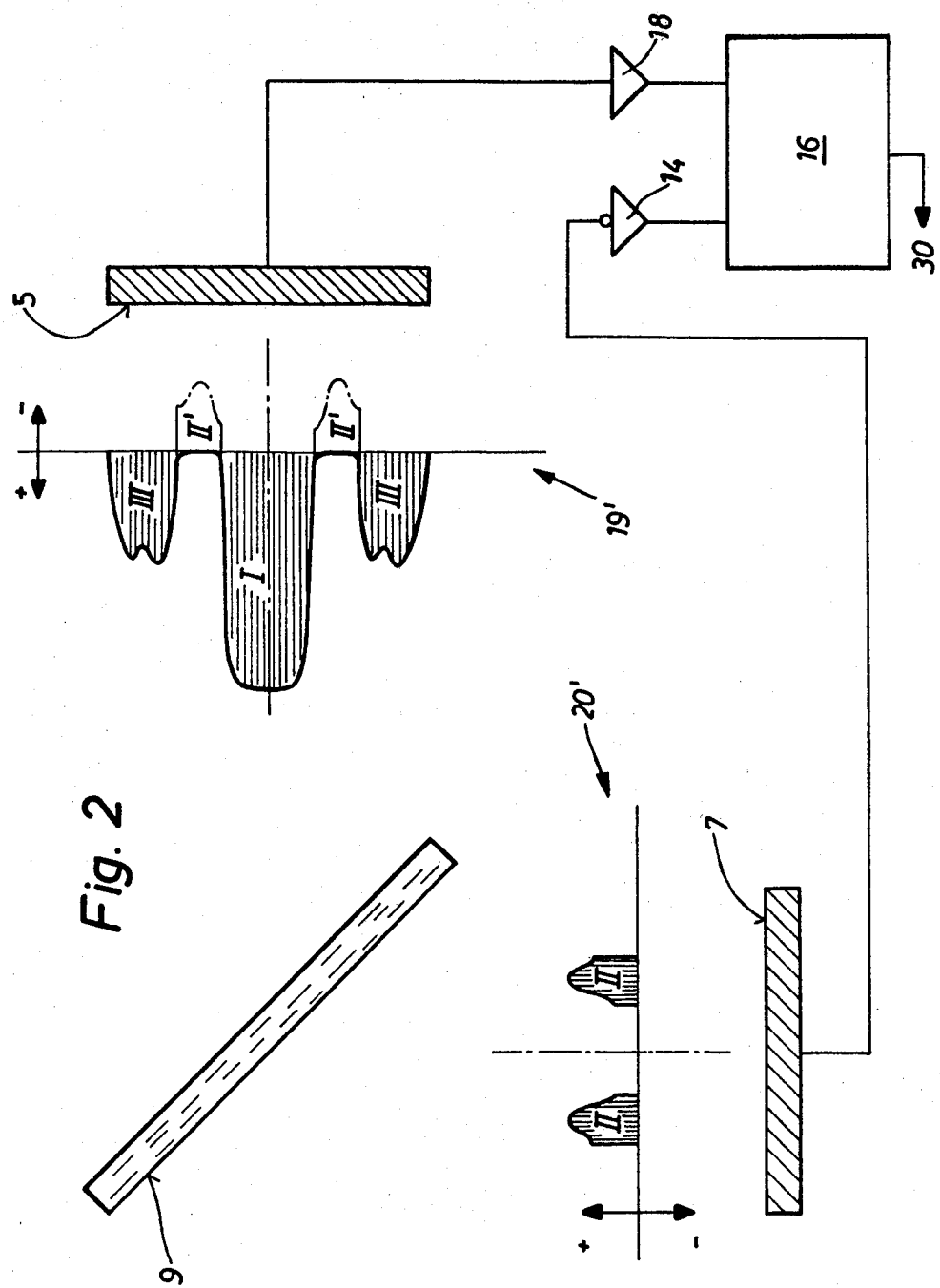

METHOD AND DEVICE FOR SEQUENTIALLY IMAGING AN ORIGINAL

FIELD OF THE INVENTION

The invention relates to a method for optically scanning the regions of an original and for generating an electrical signal dependent upon the light intensity and distribution within each scanned region, which signal is to be used for generating a discrete image of the original.

DESCRIPTION OF THE PRIOR ART

In the printing art the stepwise scanning of an original, one small region of the same after another, and the production of an image by way of a sequence of electrical scanning signals becomes more and more widespread for the production of rotogravure cylinders, especially since the plate cylinder is not made by etching the cups anymore, but by an electronically controlled engraving of each single cup, the ensemble of which makes up the screen dot matrix. To this end a, generally magnifying, optical system is used in order to measure the gray value of a small region of the original by projecting it on a photo-sensor. Thereafter the electrical signal obtained from the photo-sensor is used to control the engraving of a cup, the depth of which corresponds to said gray value. The original image is scanned throughout by a stepwise shift of the region across the whole surface of the original, and an image consisting of cups is produced, where the number of cups equals the number of regions which were scanned in the original, where these regions may in certain cases overlap. Because each scanned region must have a finite extension, there is a certain loss of local contrast wherever sharp, stepwise changes of the gray value occur, because the scanned gray value of necessity represents an average across the scanned region. For economic reasons it is very desirable to be able to use offset prints as originals, in order to produce the master prints at low cost, and also in order to need only one set of separations. However, because the offset prints themselves consist of a dot raster, and because this raster generally has either the same or a similar grid width as the rotogravure plate which is to be made, and because furthermore an absolutely exact registering of both grids is out of the question, a direct application of the engraving method just described will give rise to unwanted Moire patterns. In order to avoid this, the grid structure of the original must be suppressed, which was hitherto mostly done by using an intermediate halftone image which could be obtained e.g. by recopying. In a somewhat similar fashion the Moiré patterns can also be suppressed by choosing a size for the elementary scanning region which is large enough to cover several screen dots of the original. This naturally entails a local averaging process and thus results in a loss of resolution. In order to compensate this loss, at least partially, it is known in the art to use a detailed contrast regulating means, such as is also used for scanning halftone originals. The function of this regulating means rests on the superposition of two electrical signals, of which one corresponds to the gray value of a single scanning spot (which is generally chosen as small as possible), whilst the other signal corresponds to the average gray value of somewhat larger region containing the scanning spot and called the surrounding field. However, owing to their very conception, such regulating means do not only partially compensate for the loss of resolution due to the finite size of the scanning spot, but they also give rise to an overshoot of the imaged gray values on both sides of a sharply defined contour in the original. When viewed superficially, such an overshoot may even enhance the subjective impression of seeing a sharp contour. It is not acceptable, however, if the image is to fulfill stringent quality requirements. Moreover, when such detailed contrast enhancing means are used for generating color separations from separations consisting of dot matrixes, very disturbing color shift effects will occur, which can only be avoided by great professional skill in regulating the size of the surrounding field and of the superposition ratio for each color separately. This necessity ability in choosing different parameters for each color separation severally is a major handicap for mass production.

Furthermore, one may easily imagine a method which makes use of more than two gray values, such are obtained from a scanning spot and its surrounding field. Such a method, which has in fact already been used for very sophisticated image processing, does, for instance, divide a fairly large surrounding field into many separate, usually quadratic or hexagonal domains, which are scanned severally and yield values which are then used in some calculating process in order to obtain an optimal intensity value valid for the center of the field. Because this method requires scanning a very great number of different points, it remains complicated, irrespective of whether the scanning is done in parallel by an array of mutually neighboring sensors or else sequentially by means of a single sensor which scans the neighboring field sequentially.

The invention aims at producing a high quality image notwithstanding the use of comparatively few signals for a given surface, and also at suppressing Moire patterns whenever the original is made up of a dot matrix.

SUMMARY OF THE INVENTION

To achieve this aim the method of the invention comprises forming a signal by adding up primary signals at least one of which represents the sum of two values, one of which is obtained by the addition of strictly positively weighted local light intensities taken over a certain domain that totally or partially fills the region, whilst the other value is obtained by a similar sum which, however, is obtained by adding light intensities which are strictly negatively weighted over another domain, which also fills the region totally or partially.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 2 schematically represents a partial section through a preferred embodiment of the invention.

DETAILED DESCRIPTION OF A PREFERRED EMBODIMENT

Figure 1:
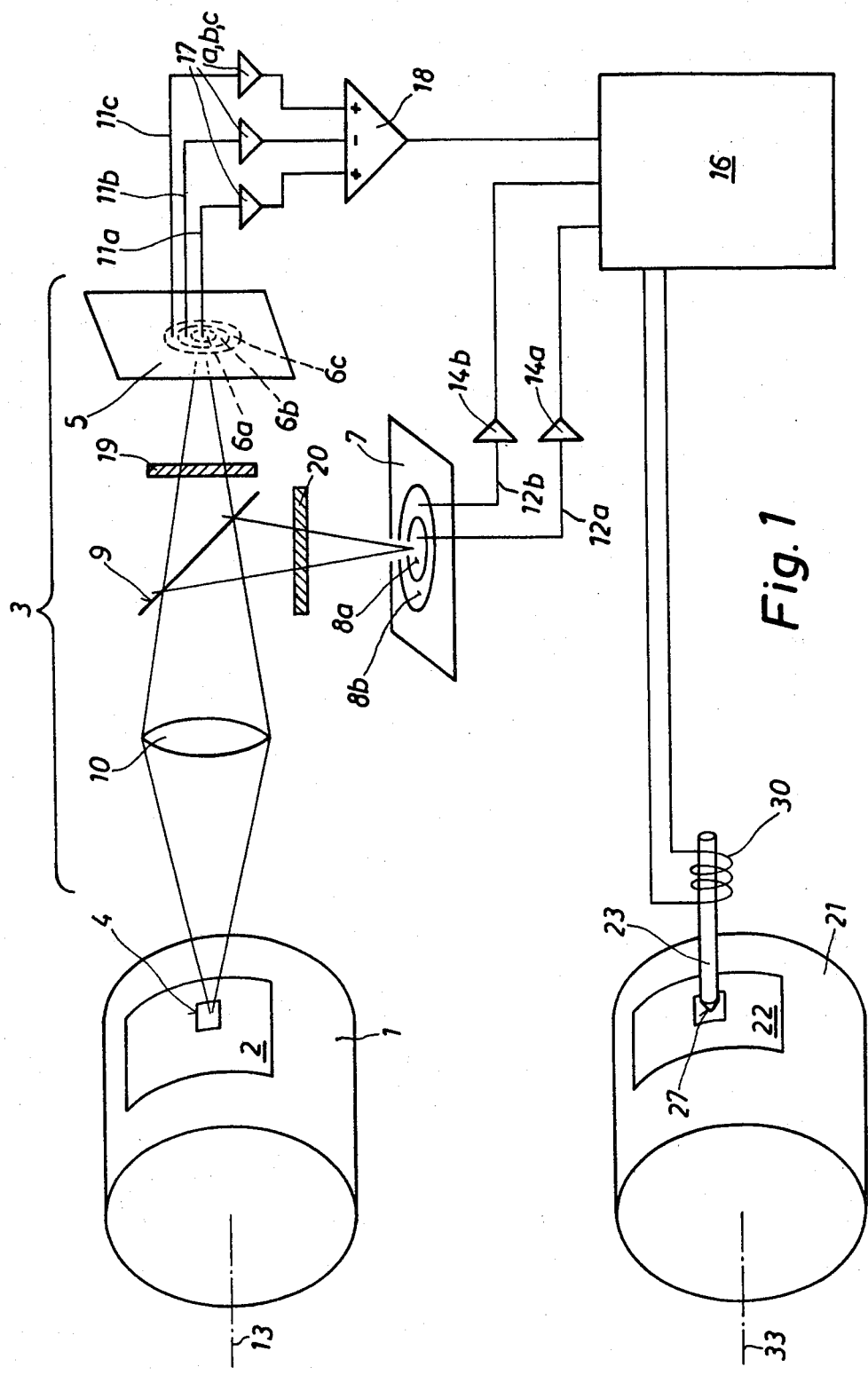
FIG. 1 sketches the principle of an embodiment of the invention.

FIG. 1 schematically shows the principle whereby a printing plate 22 is engraved through a process controlled by the sequential scan of an original image 2 positioned on a drum 1. An imaging system, globally referenced 3, measures the light within the region 4 which is used for forming an image dot, i.e. a cup 27 on the printing plate 22. To this end the scanning system 3 comprises an optical system 10 which images the region 4 onto a photosensitive surface 5 which is divided into several regions and is viewed from its rear side in FIG. 1. Each region corresponds to a single photo-sensor, and the outputs of sensor 6a, 6b, 6c are connected with the adder 18, through individual lines 11a, 11b, 11c and amplifiers 17a, 17b, 17c. In the adder 18 the output signals of the concentric sensors situated on the surface 5 are given signs, not necessarily equal, and then added. The output signal of adder 18 is forwarded to a processor 16. If one wishes the regions 6a, 6b and 6c to overlap in part, or if because of room requirements or for other reasons it is inconvenient to place the sensors side by side, then one may place a semireflective mirror 9 in the light path in order to divert a part of the light onto a second photosensitive surface 7, where the light within one or several distinct regions can again be measured. In FIG. 1 the surface 7 carries two distinct sensors 8a, 8b. The signals generated by these are, like those of the first set of sensors, forwarded separately to the processor 16, through individual lines 12a, 12b and amplifiers 14a, 14b. All sensors basically perform the same task, and one should note that although the arrangement shown will in certain cases be practical, the same effect can be obtained through the use of filters 19 and 20 shown in FIG. 1, in combination with only two sensors of which one is placed in the direct light path and the other one in the reflected light path, as explained later in connection with FIG. 2.

The processor 16 controls an electromechanic transducer 30, which in turn activates the stylus 23, which engraves a cup 27 in accordance with the light distribution within the region 4. Further means, not shown, are provided in order to move the scanning system 3 and the stylus 23 synchronously in a direction parallel to the drum axes 13, 33, and also in order to rotate both drums synchronously around their respective axis. Thereby all regions, which in general overlap mutually to some extent, of the original image 2 can be scanned, and corresponding cups, or dots, can be formed on the plate cylinder 22.

FIG. 2 schematically shows a part of an embodiment comprising only two sensors 5 and 7, which are placed in the direct light path and in the light path reflected by the semireflective mirror 9, respectively. The filters 19 and 20 of FIG. 1 are only hinted at by representing their respective transmission curves 19' and 20', it being supposed that these transmission curves have a rotational symmetry around the axis of the respective light paths. The positive direction of the transmission functions is orientated towards the left for curve 19' and upwards for curve 20'. The curve 19' has two concentric transmission zones I and III (hatched in the drawing), separated by a ring shaped opaque zone. This opaque zone corresponds to the single transmitting zone II (which is hatched, too) of the transmission curve 20' of the filter 20. The output signal of sensor 5 is led to the processor 16 through the amplifier 18, whilst the output signal of sensor 7 reaches the same processor through the inverting amplifier 14. Thereby one obtains a weighting function having a positive part I and III, as well as a negative part II', as sketched at 19'. Obviously, such an arrangement allows the obtainment of any desired weighting function through the use of only two sensors, together with two filters having a locally varying transmission value. The transition from a transmitting zone to a wholly opaque one need not be infinitely sharp, as indicated in the figure for reasons of clarity, but one may use both progressive and stepwise transitions. Also the transmission functions need not have a rotational symmetry, but may be based on a pattern without rotational symmetry, which is well adapted to a quadratic, rectangular or hexagonal grid of the regional image, for instance. The possibility of a continuous variation of the filter density allows a far greater flexibility in the weight distribution than would be possible by using many distinct sensors without screening by filters with locally varying transmission values. If needed, colored filters may also be used for making the different separations of a set.

Because the manufacture by photograhic means of filters with locally varying transmission values is comparatively easy, it is possible to produce not only filters with rotational symmetry, but also filters with transmission variations forming a diamond shaped, rectangular, or hexagonal pattern wherever the approximate grid orientation and width of the original is known in advance.

Once the signed signals, which may have been amplified by different factors, are algebraically added together, the resulting signal is processed in the usual way by processor 16, digitalized if necessary, and then used to control the stylus 23 (FIG. 1).

While there are shown and described present preferred embodiments of the invention, it is to be distinctly understood that the invention is not limited thereto, but may be otherwise variously embodied and practiced within the scope of the following claims.

Accordingly, what is claimed is:

1. Device for optically scanning a sequence of regions within an original and for generating an electrical signal dependent both upon the light intensity and upon its distribution within the region currently scanned, where a sequence of such signals is used for generating a discrete image of the original, characterized by an optional scanning head arranged so as to sequentially scan all regions, means between said scanning head and said photo-sensors for variably restricting the light impinging on said sensors, imaging each region on at least two photo-sensors, the outputs of which are connected to an inverting and to a noninverting input, respectively, of an adding circuit which generates the difference of the primary signals.

2. Device according to claim 1, characterized by a semi-reflecting mirror placed in the light beam of the scanning head, and by at least two photo-sensors, of which one is placed in each of the two partial light beams downstream of the semi-reflecting mirror.

3. Device according to claim 1, characterized by a plurality of mutually concentric sensors.

4. Device according to claim 1, wherein said means is an optical filter with locally varying density.

5. Device according to claim 4, characterized in that the density of the filter has a rotational symmetry.

6. Method for optically scanning a sequence of regions throughout an original for generating an electrical signal dependent both upon the light intensity and its distribution within the region being scanned in order to produce a discrete image of the original, characterized in that said signal is obtained through the summation of several primary signals, where at least one primary signal is proportional to the sum, calculated over a first domain that entirely or partially fills said regions, of all products of the local light intensity in each point of said first domain multiplied by a factor with an unvarying sign and an absolute value which varies as a function of the position of said point in said first domain, and where at least one other primary signal is proportional to the sum, calculated over a second domain different from the first, of all similar products of the local light intensities in said second domain multiplied by a second factor which has an unvarying sign opposite to that of said first factor.

7. Method according to claim 6, characterized by the use of exactly two primary signals.

8. Method according to claim 6, characterized in that at least one factor varies continuously within its domain.

9. Method according to claim 6, characterized in that at least two domains with factors of opposite signs overlap each other.

10. Method according to claim 6, characterized by a rotational symmetry of the values of the factors.

11. Method according to claim 6, characterized in that the domains are concentric.

* * * * *